United States Patent
Nishida et al.

(10) Patent No.: US 7,450,349 B2
(45) Date of Patent: Nov. 11, 2008

(54) MAGNETIC HEAD WITH SOFT MAGNETIC SHIELD AND MAGNETIC STORAGE

(75) Inventors: Yasutaka Nishida, Tokyo (JP); Ikuya Tagawa, Kanagawa (JP); Masafumi Mochizuki, Tokyo (JP); Roger Wood, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 335 days.

(21) Appl. No.: 11/292,575

(22) Filed: Dec. 2, 2005

(65) Prior Publication Data

US 2006/0119984 A1 Jun. 8, 2006

(30) Foreign Application Priority Data

Dec. 3, 2004 (JP) ............................. 2004-351654

(51) Int. Cl.
*G11B 5/39* (2006.01)

(52) U.S. Cl. ........................................ 360/319
(58) Field of Classification Search ................ 360/319, 360/317
See application file for complete search history.

(56) References Cited

U.S. PATENT DOCUMENTS

| | | | | | |
|---|---|---|---|---|---|
| 3,975,772 | A | * | 8/1976 | Lin | ............... 360/317 |
| 4,071,868 | A | * | 1/1978 | Kaminaka et al. | ............ 360/319 |
| 4,656,546 | A | * | 4/1987 | Mallory | ............... 360/110 |
| 4,698,711 | A | * | 10/1987 | Vinal | ............... 360/321 |
| 4,843,506 | A | * | 6/1989 | Gill et al. | ............... 360/319 |
| 4,935,832 | A | * | 6/1990 | Das et al. | ............... 360/112 |
| 5,075,956 | A | | 12/1991 | Das | |
| 6,430,010 | B1 | * | 8/2002 | Murdock | ............... 360/319 |
| 6,597,545 | B2 | * | 7/2003 | Macken et al. | ............... 360/319 |
| 6,954,340 | B2 | * | 10/2005 | Shukh et al. | ............... 360/317 |
| 7,002,775 | B2 | * | 2/2006 | Hsu et al. | ............... 360/125 |
| 7,042,682 | B2 | * | 5/2006 | Hu et al. | ............... 360/317 |
| 7,295,401 | B2 | * | 11/2007 | Jayasekara et al. | .......... 360/317 |
| 2006/0092575 | A1 | * | 5/2006 | Mochizuki et al. | .......... 360/317 |

FOREIGN PATENT DOCUMENTS

| | | | |
|---|---|---|---|
| JP | 62129915 A | * | 6/1987 |
| JP | 02-014410 A | | 1/1990 |
| JP | 02-201710 A | | 9/1990 |
| JP | 06-236674 | | 8/1994 |
| JP | 2000-339656 | | 12/2000 |
| JP | 2003-77266 | | 3/2003 |
| JP | 2004-047110 | | 2/2004 |

OTHER PUBLICATIONS

IBM Technical Disclosure Bulletin. "Shield for Protecting Magnetic Head from Ambient AC and DC Magnetic Fields". vol. No. 18, Issue No. 7; p. No. 2258-2259. Cross Reference: 0018-8689-18-7-2258. Dec. 1, 1975.*

* cited by examiner

*Primary Examiner*—Tianjie Chen
(74) *Attorney, Agent, or Firm*—Townsend and Townsend and Crew LLP; Rambod Nader

(57) ABSTRACT

Embodiments of the invention avoid erasure of recorded data by concentrating stray fields on a magnetic head element. According to one embodiment, in a magnetic storage apparatus using a perpendicular recording medium with a soft magnetic under layer, a soft magnetic shield is provided so as to surround the upper parts and sides of magnetic head elements. A distance between the soft magnetic shield and the medium is shorter than that between the soft magnetic shield and the magnetic head element.

18 Claims, 9 Drawing Sheets

(a)  (b)

(a)

(b)

(a)

(b)

(a) (b)

(a) (b)

(prior art)

MAGNETIC HEAD WITH SOFT MAGNETIC SHIELD AND MAGNETIC STORAGE

CROSS-REFERENCES TO RELATED APPLICATIONS

This application claims priority from Japanese Patent Application No. JP2004-351654, filed Dec. 3, 2004, the entire disclosure of which is incorporated herein by reference.

BACKGROUND OF THE INVENTION

The present invention relates to magnetic heads, and magnetic storage apparatus using the same. More particularly, the invention relates to a magnetic storage apparatus which comprises a magnetic head including a single pole type writer, and a double layered magnetic recording medium having a soft magnetic under layer.

To enhance recording density of a magnetic disk device, a double layered perpendicular recording system is advantageous which combines a double layered perpendicular magnetic recording medium having a recording layer and a soft magnetic under layer, and a magnetic head having a single pole type writer mounted thereon. FIG. 13 is a schematic diagram illustrating the structure of the magnetic head and the medium in the double layered perpendicular recording system. The single pole type writer includes a main-pole 11, a return-pole 12, and a coil 13 for generating recording magnetic fields to be applied to a double layered perpendicular magnetic recording medium 20 by the main-pole 11. The single pole type magnetic head is generally formed integrally with a read head which includes a magneto-resistive element sandwiched between a pair of reader shields 14 and 15. The double layered perpendicular magnetic recording medium 20 comprises a soft magnetic under layer 22, a magnetic recording layer 23, and a protective layer 24, which are formed on a substrate 21. Between the magnetic recording layer and the soft magnetic under layer, or between the soft magnetic under layer and the substrate, a non-magnetic layer may intervene for the purpose of, for example, improvement of crystallinity of an upper layer, improvement of interlaminar adhesion, or the like. It should be noted that there is proposed an application of the single pole type recording head which includes a soft magnetic member disposed in the vicinity of a main-pole so as to change recording field distribution, but a magnetic pole that generates a magnetic field to finally magnetize the recording medium is herein defined as a main-pole.

FIG. 14 shows explanatory diagrams of a double layered perpendicular recording system and a longitudinal recording system. More specifically, FIG. 14(a) shows the double layered perpendicular recording system, while FIG. 14(b) the longitudinal recording system. As shown in the FIG. 14(b), in the conventional longitudinal recording system, a magnetic field 142 leaking from a recording head gap 141 is used to record information on a medium 143. On the other hand, in the use of a double layered perpendicular recording medium, since a magnetic flux created from a recording element passes through a soft magnetic under layer 22, the recording field density 143 144 to be applied to the magnetic recording layer 23 becomes large. This feature of the double layered system is an advantage in the achievement of high density. However, in this system, when an external field is applied from the outside as shown in FIG. 15, magnetic fluxes are concentrated between the magnetic head and the soft magnetic under layer, thus causing extremely large magnetic fields directly below the main-pole 11 of the magnetic head, compared with magnetic fields 151 applied from the outside. Such concentration of stray magnetic fields on the magnetic head erases recorded data or degrades the quality of signals. A remedial measure against this problem may be provided by the modification of the structure and magnetic characteristics of the head, and of the structure and magnetic characteristics of the soft magnetic under layer. However, it is inevitable in view of the principle that the double layered perpendicular recording system is more sensitive to the external field than the conventional longitudinal magnetic recording system.

To avoid this problem, hitherto, there is proposed a system which includes a soft magnetic shield attached to the whole or part of the device. In any case, the device has an object to decrease the amount of the magnetic fluxes flowing in the head of the device and the recording medium by attaching the shield serving as a composition other than the head and the medium so as to divert the magnetic fluxes created by the external field through the shield.

Known systems are described, for example, in JP-A No. 47110/2004, JP-A No. 77266/2003, and JP-A No. 236674/1994.

BRIEF SUMMARY OF THE INVENTION

The double layered perpendicular recording system has high sensitivity and low robustness to the external field in principle. The improvement of these features is limited even if the structures and magnetic characteristics of the magnetic head and recording medium are modified. In the method for attaching the shield outside the drive chassis, a distance diverted is so long that the magnetic resistance becomes large, which results in a large amount of leakage flux in a chassis. To prevent this state, and to achieve a sufficient effect, the thickness of the shield has to be larger. This disadvantageously leads to an increase in size and weight of the device. The attachment of the shield onto a part other than the conventional components often needs modification of the device structure, which might result in increased costs related to the development of the device. JP-A No. 14410/1990 proposes an arrangement in which a shield is provided in the vicinity of a head element. This shield is to decrease the magnetic fluxes from adjoining tracks in reproducing, and hence is insufficient to obtain an effect on the external field.

It is a feature of the invention to effectively improve external field robustness in the double layered perpendicular recording system without the modification of the device structure.

According to an aspect of the present invention, in a fabricating process of a head element, a soft magnetic shield is disposed so as to surround the upper part and side of the magnetic head element with a medium-facing surface set as a lower surface. This soft magnetic shield is fabricated in a plane parallel to a layer of the head element, in the same process as the head element layer. Note that the magnetic head element indicates herein a soft magnetic member for recording which includes a main-pole, a return-pole, and the like, and a soft magnetic member which includes a reader shield for a reader element, such as a MR element, or a GMR element. The shape and arrangement of the soft magnetic shield is determined such that the shortest distance between the soft magnetic shield and the magnetic recording medium surface is shorter than that between the soft magnetic shield and the magnetic head element. Providing such soft magnetic shield structure guides a floating magnetic field from the soft magnetic shield to the soft magnetic under layer of the magnetic recording medium, whereby the stray fields are concentrated on the magnetic head element, and not applied to the magnetic recording medium. Thus, the problem of erasing of recorded data due to the floating field or the like is not caused.

When the soft magnetic shield is located near the magnetic head element, magnetic fluxes gathered by the shield with large volume may enter the head element, and hence the more fluxes may be concentrated, which might produce the contrary effect. However, since the soft magnetic shield is not shaped so as to concentrate the fluxes on the medium-facing surface, unlike in the case of the main-pole for recording, the single soft magnetic shield itself cannot readily induce the concentration of the fluxes. The ratio of an area of the medium-facing surface of the shield to an area of the shield viewed from the above can be used as a measure of the degree of concentration of the fluxes. That is, assuming that 100% of the magnetic flux entering the shield from the above in a vertical direction will leave the medium-facing surface of the shield, the fluxes are concentrated to the extent specified by the above-mentioned area ratio. For the main-pole of the present single pole type writer, the above-mentioned area ratio is 50 times or more. (For example, the width of the upper part of the main-pole layer is about 10 μm to 20 μm with respect to the track width of the main-pole of about 0.2 μm.) The soft magnetic shield is larger than the magnetic head element, and the fluxes are easy to gather. Taking these features into consideration, if an area ratio is one tenth of the foregoing area ratio, i.e., five times, influence of the concentration of the fluxes induced by the soft magnetic shield proves to be small.

The invention can provide a magnetic storage apparatus with high reliability that enables improvement of the floating field robustness in the use of a double layered perpendicular recording medium with a soft magnetic under layer. In particular, the invention has an advantage in the application of a small-sized magnetic storage apparatus that is not susceptible to modification of its structure.

DETAILED DESCRIPTION OF THE INVENTION

Specific embodiments of the invention will be described below with reference to the accompanying drawings.

Figure 1:
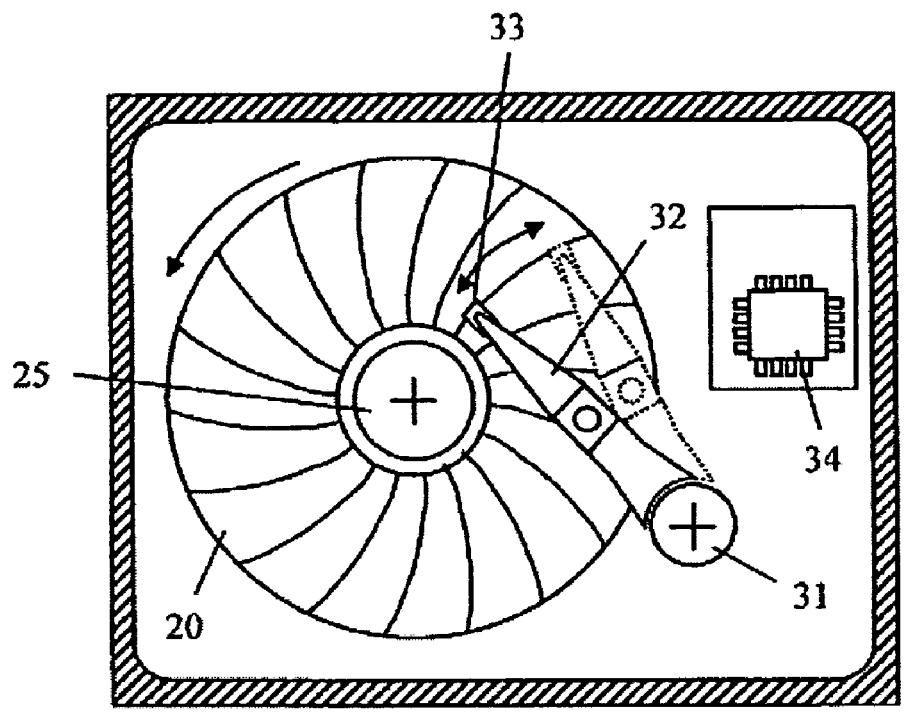
FIG. 1 is a schematically plan view of a magnetic storage apparatus according to an embodiment of the invention.
Figure 2:
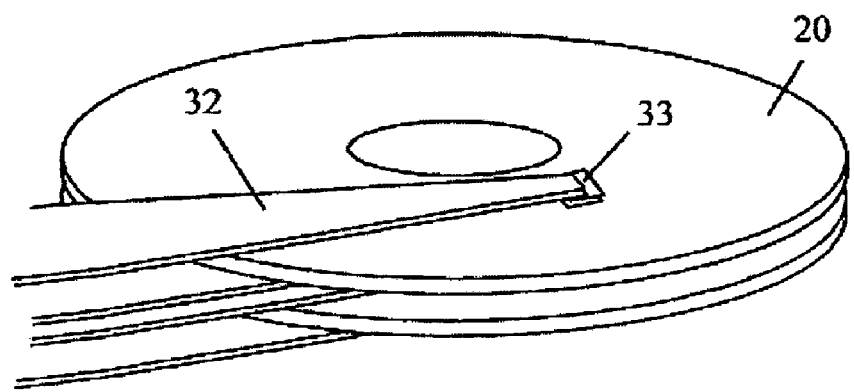
FIG. 2 is a schematic view of a magnetic disk and a suspension part.
Figure 3:
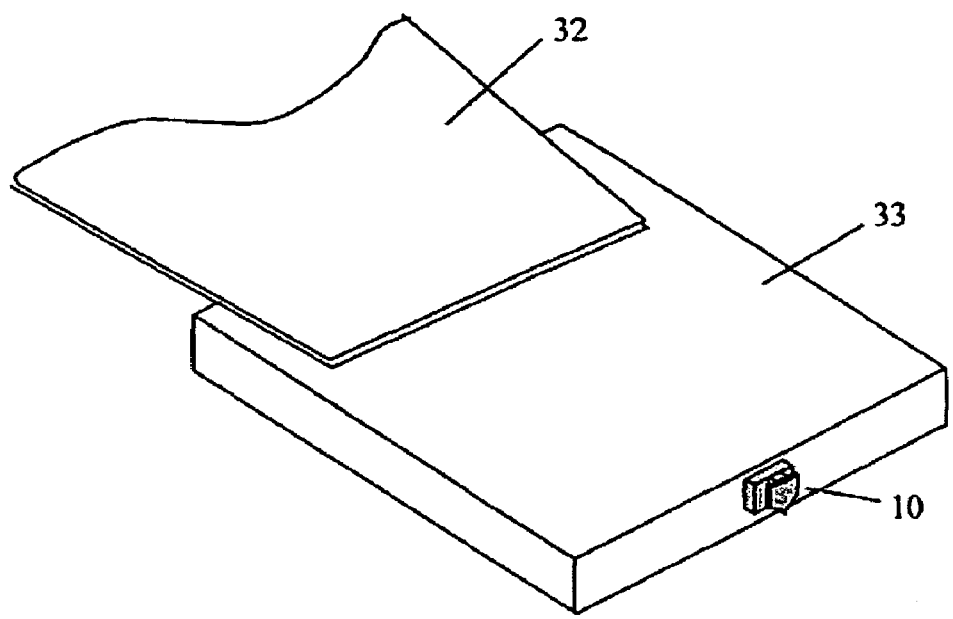
FIG. 3 is an explanatory diagram showing an example of the structure of a slider and a head element of the magnetic storage apparatus.

FIG. 1 shows a schematically plan view of a magnetic storage apparatus according to an embodiment of the invention, FIG. 2 a schematic view of a magnetic disk and a suspension part taken out, and FIG. 3 a schematic enlargement view of a slider part.

A magnetic disk device comprises a disk-shaped double layered perpendicular magnetic recording medium 20 including a recording layer and a soft magnetic under layer, and a suspension 32 supporting a slider 33 with a magnetic head mounted on its tip end, as shown in FIGS. 1 and 2. As shown in FIG. 3, the magnetic head element 10 is formed on the tip end (rear end) of the slider 33 supported by the suspension 32. The magnetic head 10 includes a magneto-resistive element sandwiched between a pair of reader shields as a read head, and a single pole type writer including a main-pole and a return-pole as a recording head. The magnetic recording medium 20 is rotatably driven by a motor 25. The magnetic head 10 of the slider 33 is aligned in a desired track on the magnetic recording medium 20 by an actuator 31 such as a voice coil motor. A signal processing unit 34 processes a recording signal to be sent to the recording head, and a reproduction signal transmitted from the read head.

The magnetic head element part is formed on the rear end surface of the slider mostly by sputtering, plating, or the like. A soft magnetic shield is basically formed or coated concurrently with formation of the magnetic head element, and hence is shaped so as to surround the upper surface and sides of the head element in the same plane as the head element, or in a plane parallel to the element. The soft magnetic shield is desirably formed so as to cover the whole of the head element. However, since the soft magnetic shield is located near the head element and the size of the shield is much larger than that of the head element, it is not necessary to cover the whole element. That is, the soft magnetic shield is protruded toward the outside of the head element, thereby gathering magnetic fluxes from the outside. This feature can provide a sufficient shield effect.

Embodiment 1

An embodiment will be explained below in which the soft magnetic shield of the invention is applied to a double layered perpendicular magnetic recording medium including a magnetic recording layer with perpendicular magnetic anisotropy and a soft magnetic under layer, and to a magnetic storage apparatus using a single pole type writer and a MR read head.

Figure 4:
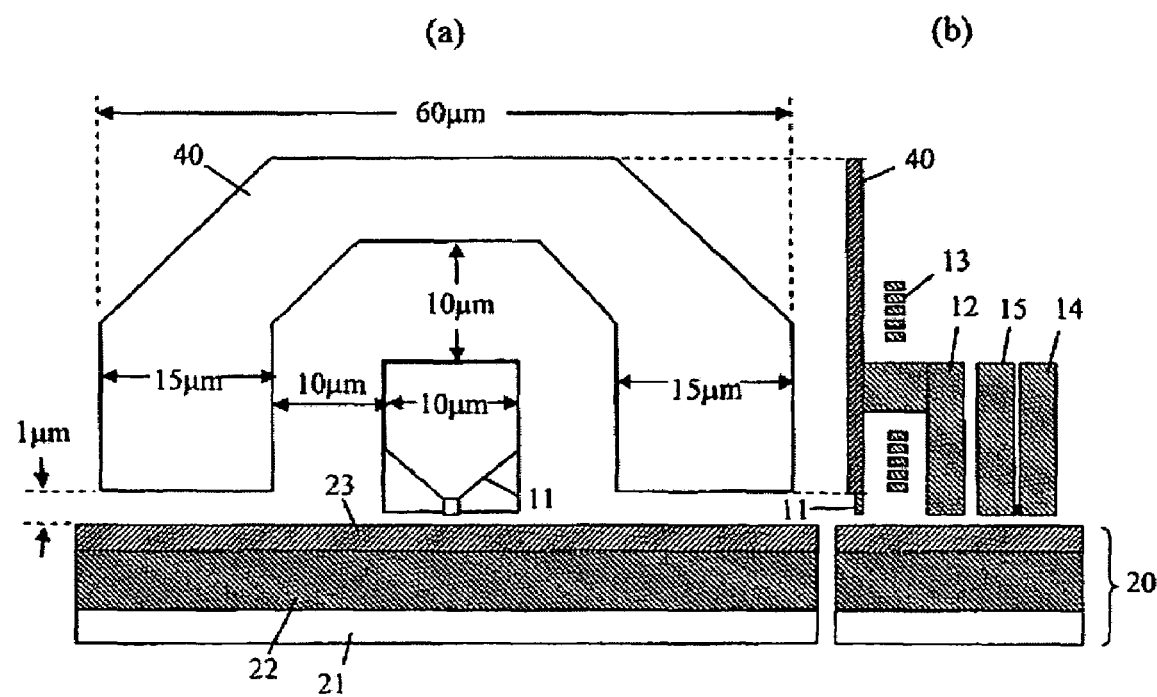
FIG. 4 is a schematic view showing an example of the structure of the magnetic head element according to the invention.

FIG. 4 is a schematic diagram illustrating an example of the structure of the magnetic head element according to the present invention. FIG. 4(a) is a plan view showing a surface including a main-pole and the soft magnetic shield, and FIG. 4(b) is a sectional view of the magnetic head. Note that the cross-section of the magnetic recording medium is schematically shown in the figure. In this embodiment, a wide part of the main-pole on its upper side has the same width and height as the return-pole, and the reader shield.

The soft magnetic shield 40 In this embodiment is formed so as to surround the main-pole 11 which forms magnetization for recording, in the same plane as the main-pole. The soft magnetic shield 40 in the example can be formed relatively easily by coating it concurrently with the formation of the layer constituting the main-pole.

In this embodiment, the shortest distance between the soft magnetic shield 40 and the main-pole is about 10 μm. A distance between the tip end of the head element and the medium surface is about 20 nm. A distance between the tip end of the head element and the soft magnetic under layer 22 is about 50 μm. The tip end of the soft magnetic shield 40 on its air-bearing-surface side is located at a higher level in a height direction of the element than the tip end of the head element on its air-bearing-surface side by about one micrometer. However, the magneto-resistance between the soft magnetic shield 40 and the head element is sufficiently large, compared with the magneto-resistance between the soft magnetic shield 40 and the medium, whereby magnetic fluxes entering the shield 40 readily flows in the magnetic recording medium 20, in comparison with a magnetic member including the main-pole 11, the return-pole 12, and the reader shields 14 and 15, which member constitutes the magnetic head element. A distance between the soft magnetic shield and the medium needs to be optimized by taking magneto-resistance thereof so as to decrease the intensity of the field flowing in the medium under layer from the soft magnetic shield, and to prevent the magnetic flux from flowing from the soft magnetic shield in the head element. In this example, the soft magnetic shield is located at the higher level than the main-pole by about one micrometer.

Figure 5:
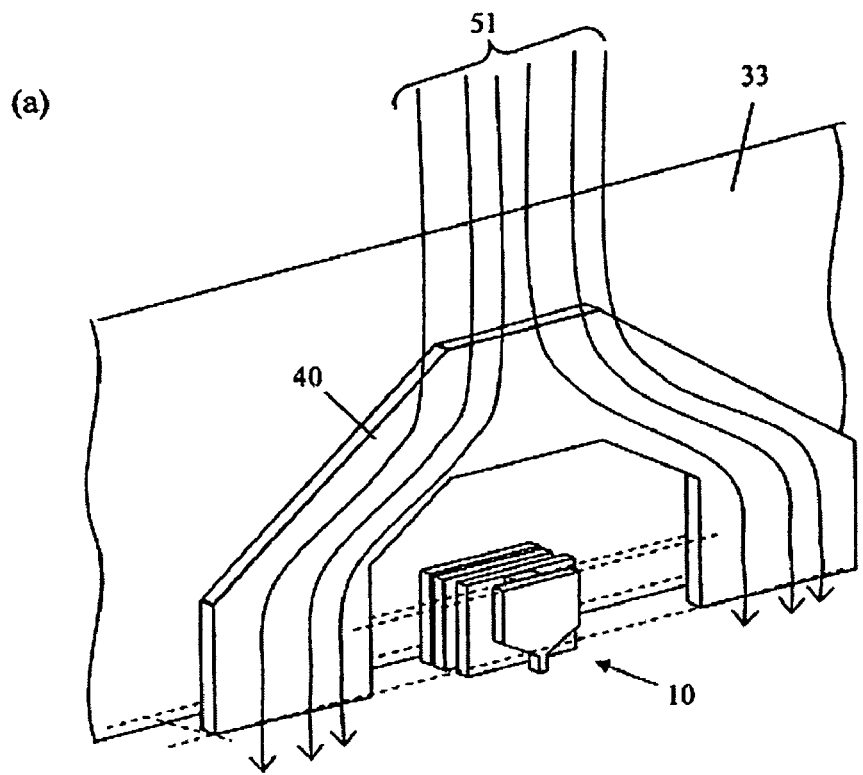
FIG. 5 is an explanatory view showing a flow of magnetic fluxes in a soft magnetic shield according to the invention.
Figure 5:
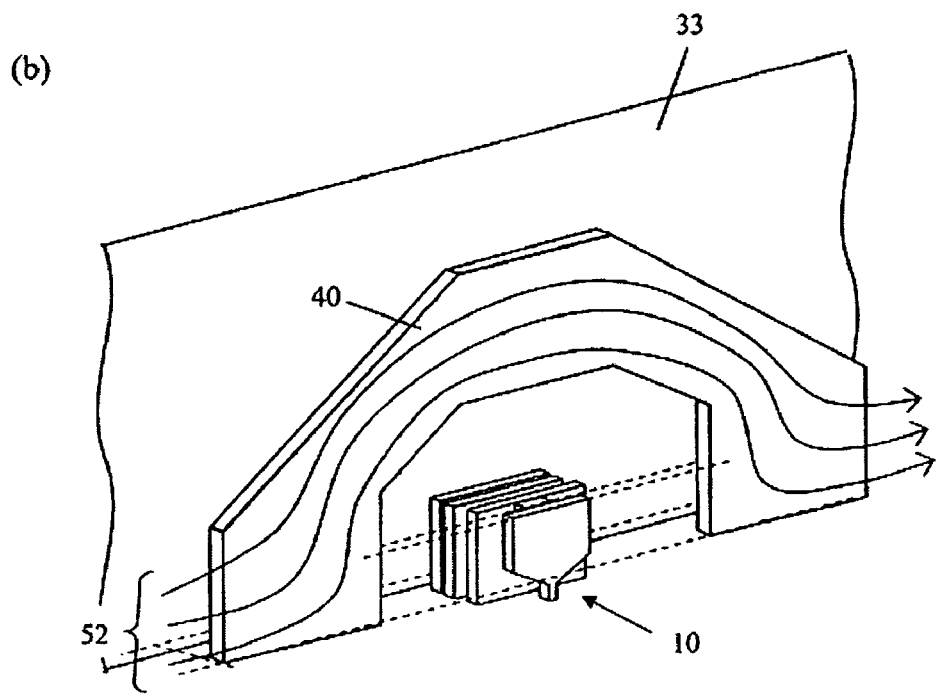

That is, as shown in FIG. 5(a), magnetic fluxes 51 progressing from the outside in a vertical direction with respect to the medium surface are likely to flow in the recording medium through the soft magnetic shield 40, but do not flow in the magnetic member constituting the element of the magnetic head 10. As shown in FIG. 5(b), an external field 52 passing in a parallel direction to the medium surface is likely to pass through the soft magnetic shield 40, and is prevented from flowing in the magnetic member constituting the element of the magnetic head 10.

A width of a medium-facing surface of the soft magnetic shield 40 is 15 μm on each of the right and left sides of the main-pole, as shown in FIG. 4(a). A total width of the soft magnetic shield is 60 μm. An area of the medium-facing surface is about one half of an area of the soft magnetic shield 40 viewed from above. The concentration of magnetic fluxes on the simple soft magnetic shield 40 itself is sufficiently low, compared with the main magnetic pole of the magnetic head.

Figure 6:
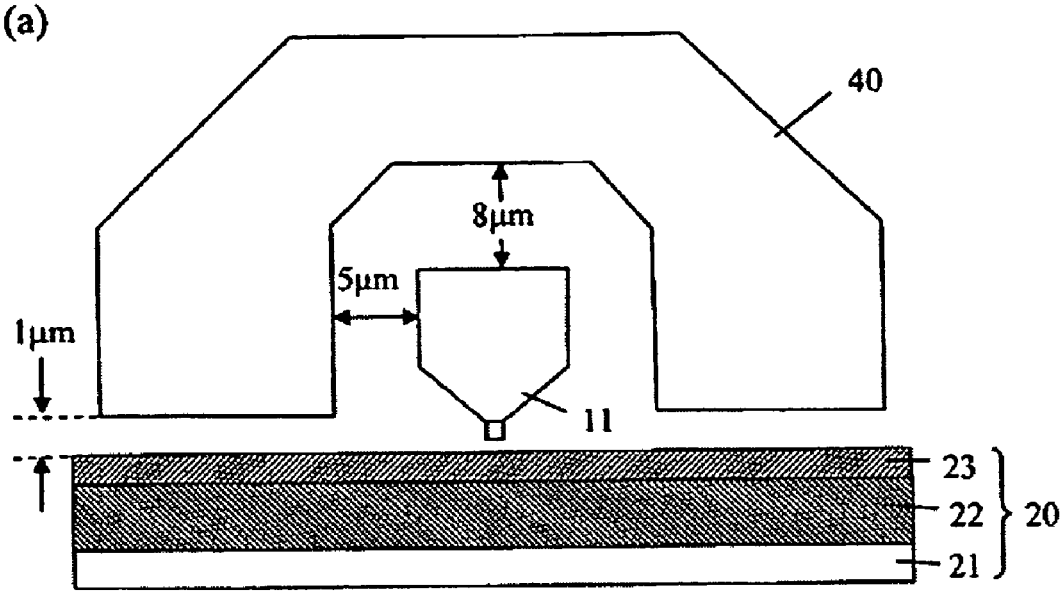
FIG. 6 is an explanatory diagram showing another example of the structure of a soft magnetic shield according to the invention.
Figure 6:
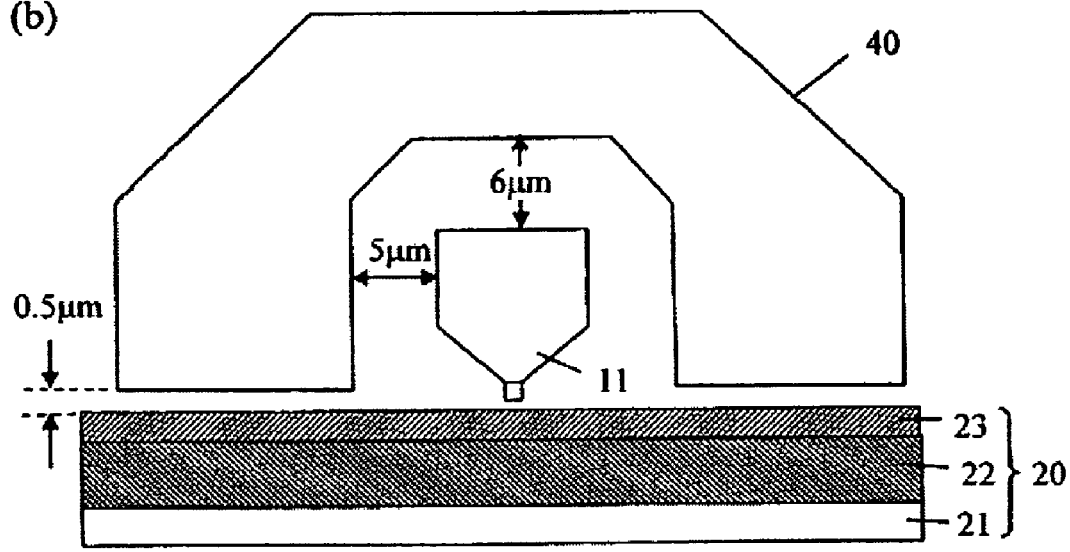

As shown in FIGS. 6(a) or 6(b), distances between the magnetic material shield 40 and each of the head element and the medium surface can be set in such a range that a distance between the soft magnetic shield 40 and the magnetic member constituting the magnetic head element is larger than a distance between the soft magnetic shield 40 and the surface of the magnetic recording medium 20.

Embodiment 2

Figure 7:
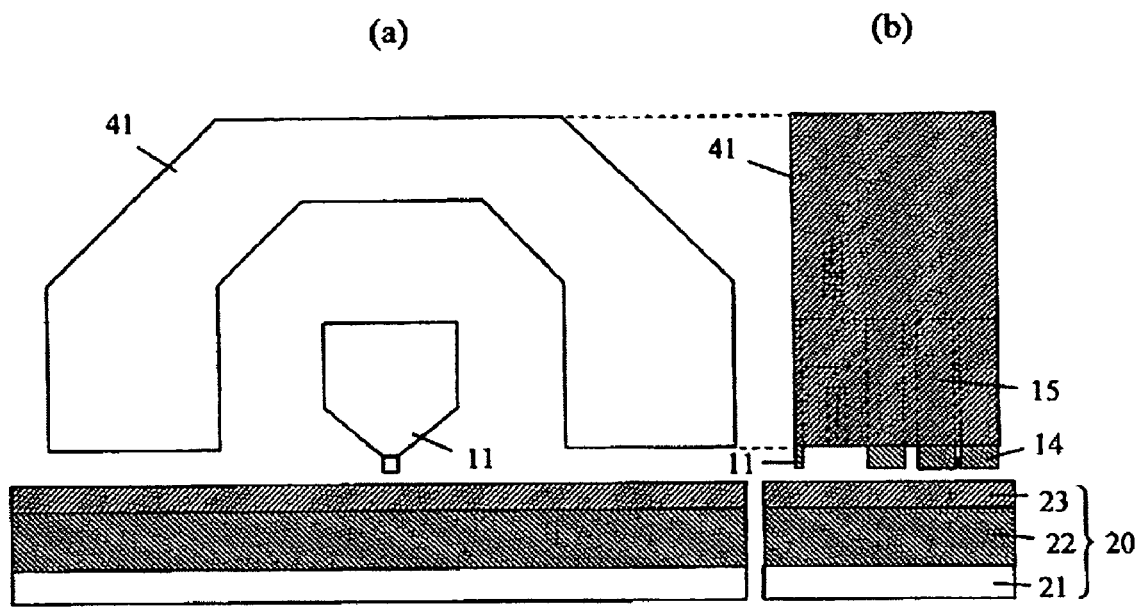
FIG. 7 is an explanatory diagram showing a further example of the structure of a soft magnetic shield according to the invention.

FIG. 7 is a schematic diagram illustrating another example of the structure of a magnetic head element according to the present invention. FIG. 7(a) is a plan view showing a surface including a main-pole and a soft magnetic shield, and FIG. 7(b) is a sectional view of the magnetic head. Note that the cross-section of a magnetic recording medium is schematically shown in the figure.

In this embodiment, a thick soft magnetic shield 41 is disposed so as to surround not only the main-pole 11 for recording, but also the whole magnetic member constituting the magnetic head element. The features of the soft magnetic shield 41 other than the thickness, including the shape, are the same as in Embodiment 1. The most influence of the external field is exerted on the main-pole. However, the magnetic fluxes may be in principle concentrated on the ends of a return-pole and a reader shield, and the fluxes may flow from these magnetic members in the main-pole. For this reason, providing the soft magnetic shield 41 around the entire magnetic head element enhances this effect.

In this embodiment, in order to thicken the soft magnetic shield 41, the shield 41 is also formed concurrently with the formation of layers of the head element. As a result, the thick shield is formed in the form of lamination. Thickening the shield allows the external floating field to concentrate on the soft magnetic shield 41 more readily. If the amount of the floating field concentrated is more than necessary, an erasure problem may be caused by the soft magnetic shield itself. Note that although the optimization of the thickness, an edge shape in detail, and magnetic characteristics of the magnetic head element should be carried out depending on the size of the element, the basic structure of the head element is the same as Embodiment 1.

Since the thickness and volume of the soft magnetic shield exert influences on the thermal conductivity of the whole element and other characteristics, they need to be designed by taking into consideration the influences on these characteristics in addition to improving the external field robustness of the recording system. The soft magnetic shield is effectively formed concurrently with the formation of the magnetic layers such as the main-pole, the return-pole, and the reader shield of the head element.

Figure 8:
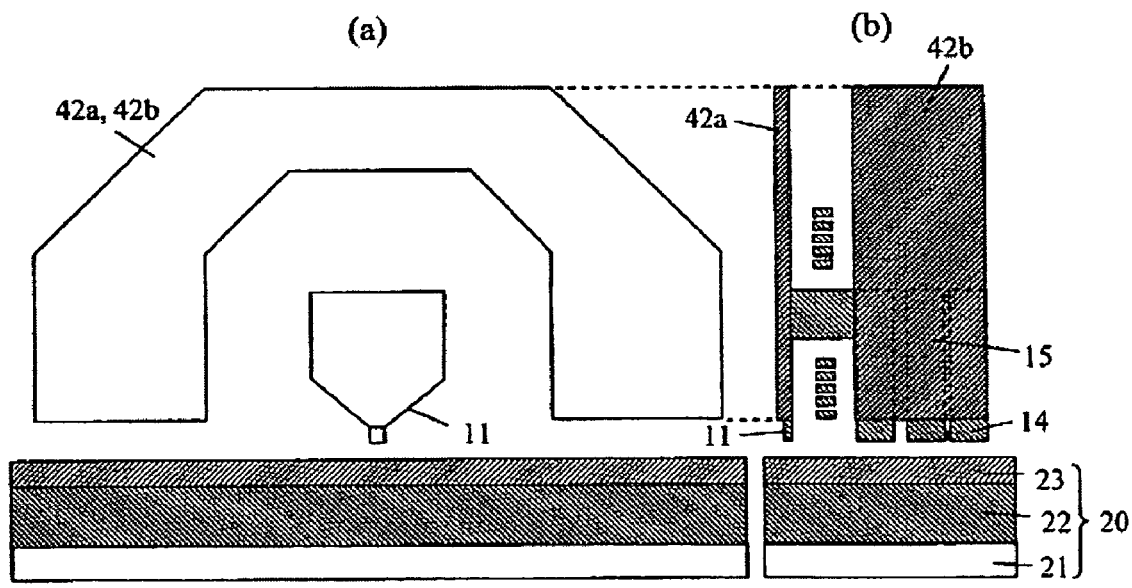
FIG. 8 is an explanatory diagram showing a further example of the structure of a soft magnetic shield according to the invention.
Figure 12:
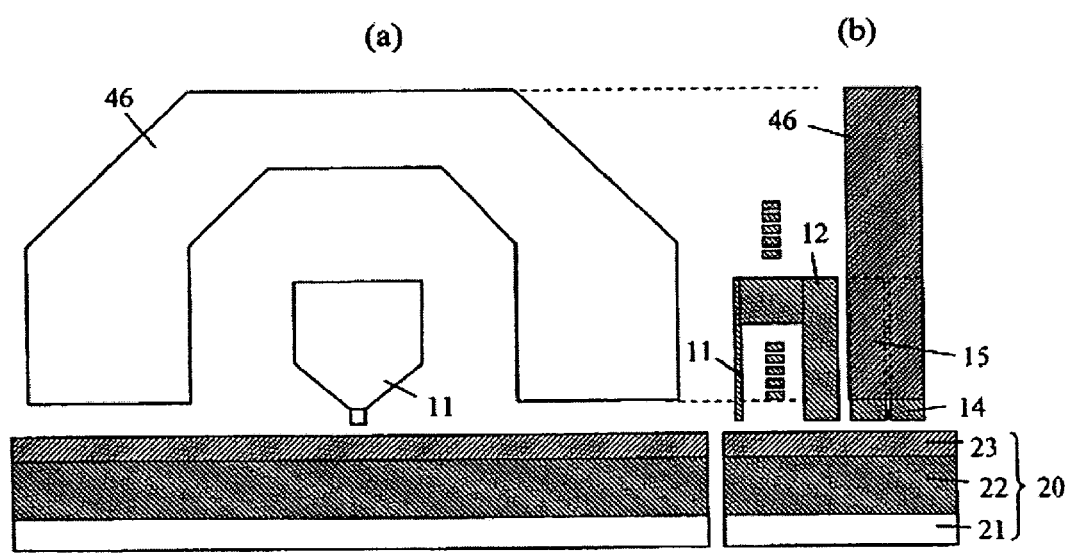
FIG. 12 is an explanatory diagram showing a further example of the structure of a soft magnetic shield according to the invention.
Figure 13:
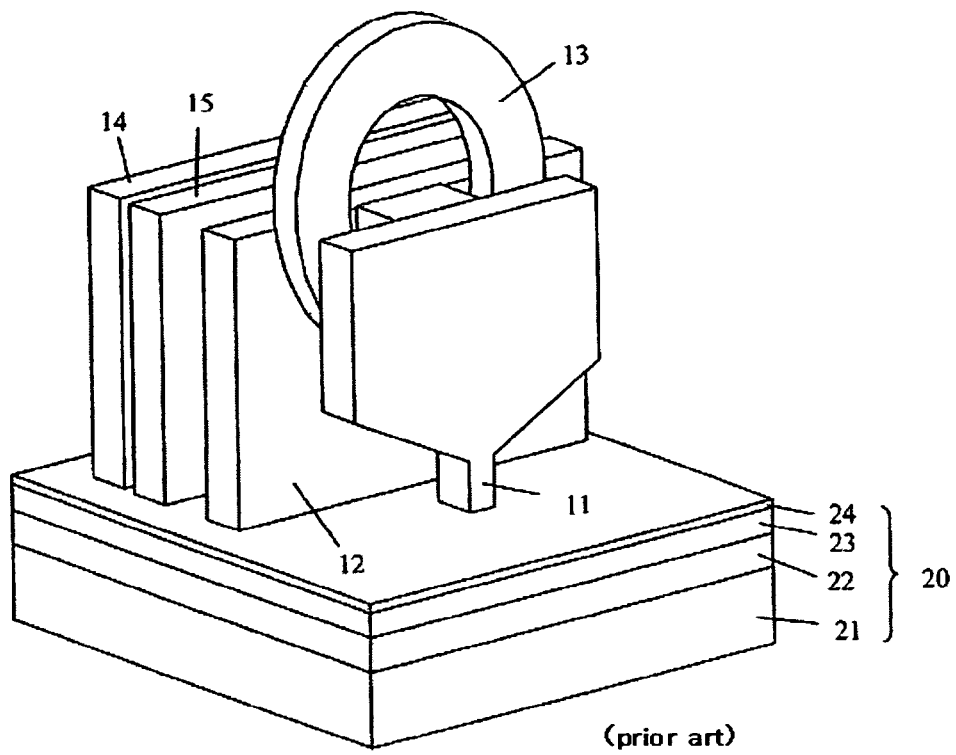
FIG. 13 is a schematic diagram of a magnetic head and a magnetic recording medium in a double layered perpendicular recording system.
Figure 14:
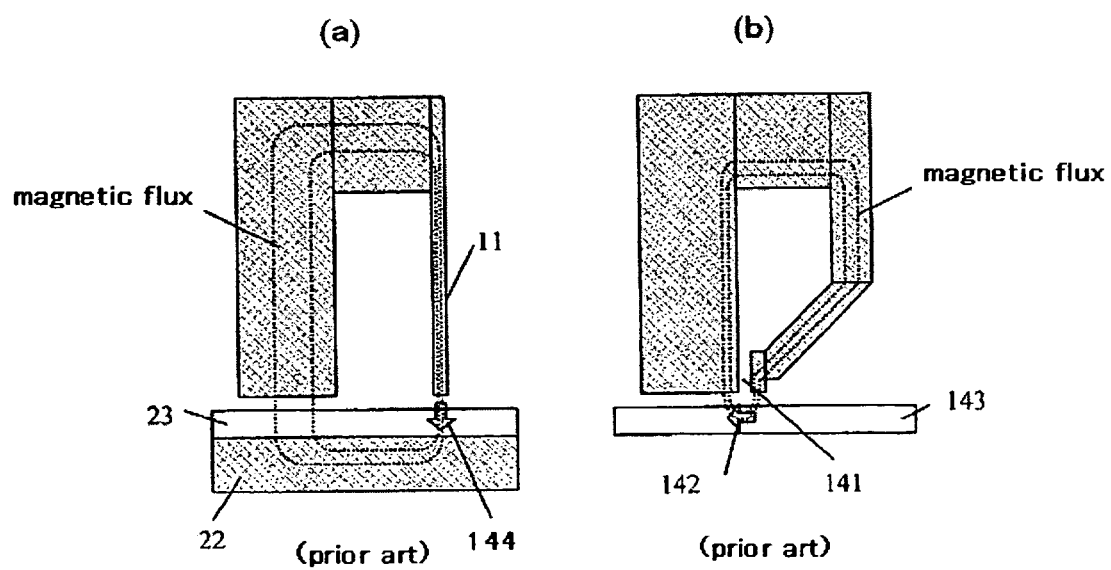
FIG. 14 is an explanatory diagram of a double layered perpendicular recording system and a longitudinal recording system.
Figure 15:
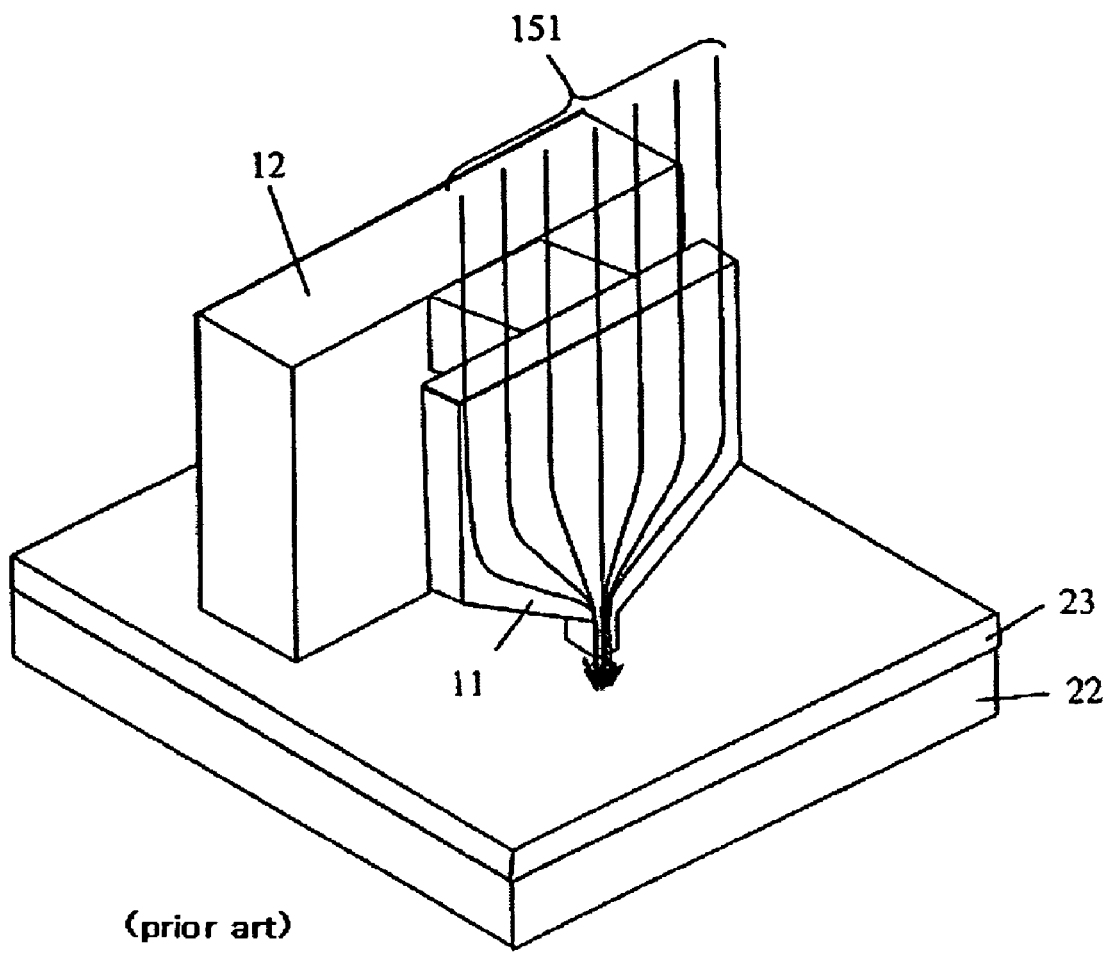
FIG. 15 is an explanatory diagram illustrating concentration of external fields on a single pole type writer in the double layered perpendicular recording system.

FIGS. 8 and 12 show schematic diagrams illustrating other examples of the structures of magnetic head elements according to the invention, wherein (a) is a plan view showing a surface including a main-pole and a soft magnetic shield, and (b) is a sectional view thereof. Note that the cross-section of a magnetic recording medium is schematically shown in the figure.

As shown in these examples, the position of formation of the soft magnetic shield in a thickness direction may be set only in the same plane as the return-pole, or only in the same plane as the reader shield, or in the same plane as the return-pole and the reader shield, depending on the fabricating processes of the whole head. In any case, the soft magnetic shield is projected from the head element outward, so that the magnetic flux can enter readily therein from the outside, thus producing a shield effect.

FIG. 8 illustrates an example of a magnetic head with two layers of the soft magnetic shields. In this example, a soft magnetic shield 42a is formed so as to surround the upper part and sides of the main-pole 11 in the same plane as the main-pole 11, while another soft magnetic shield 42b is formed so as to surround the sides and upper parts of the return-pole 12 and the reader shields 14 and 15.

Figure 9:
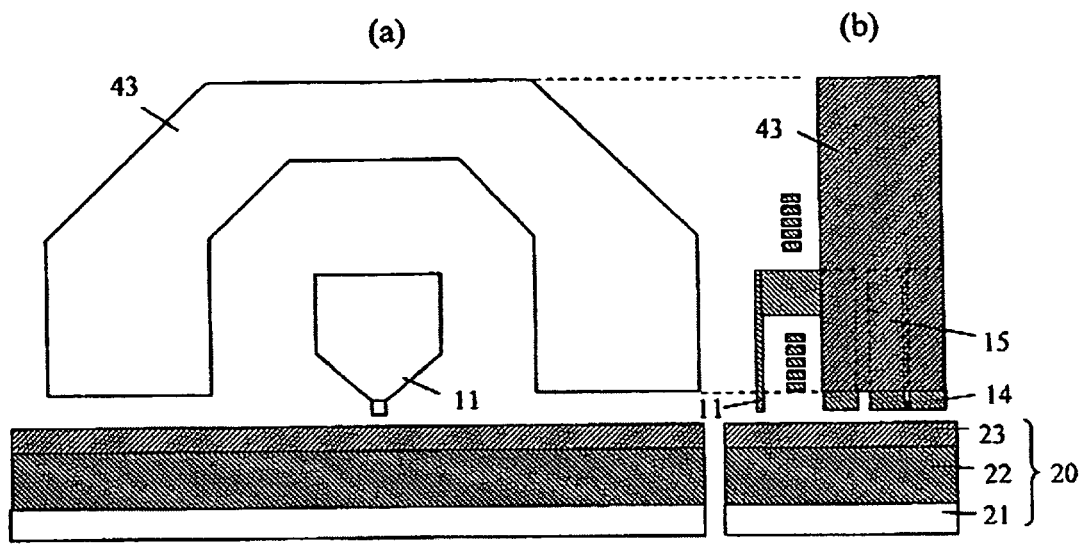
FIG. 9 is an explanatory diagram showing a further example of the structure of a soft magnetic shield according to the invention.

FIG. 9 illustrates an example in which a soft magnetic shield 43 is formed so as to surround the upper parts and sides of the return-pole 12 and the reader shields 14 and 15.

Figure 10:
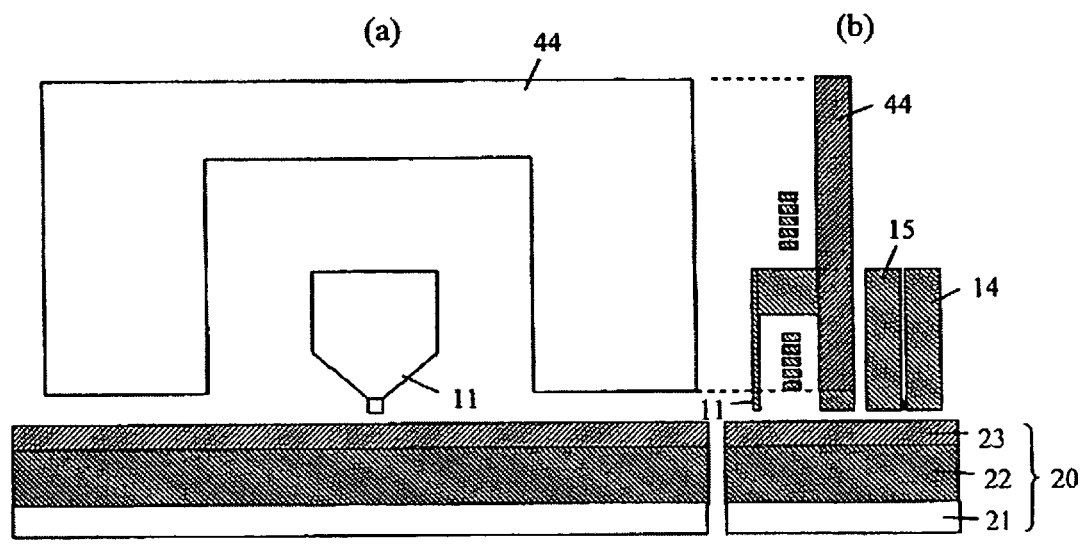
FIG. 10 is an explanatory diagram showing a further example of the structure of a soft magnetic shield according to the invention.
Figure 11:
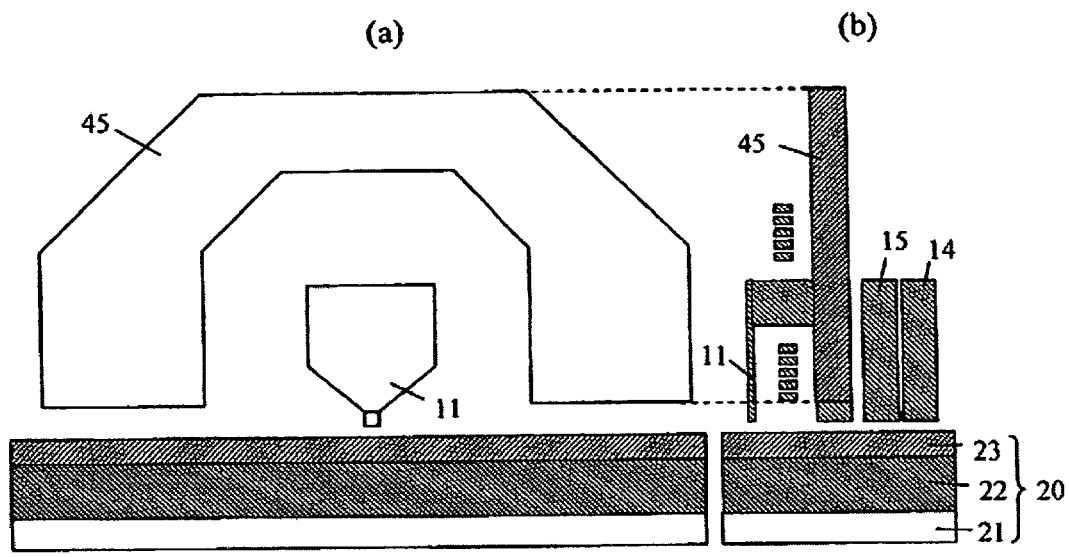
FIG. 11 is an explanatory diagram showing a further example of the structure of a soft magnetic shield according to the invention.

FIG. 10 illustrates an example in which a soft magnetic shield 44 is formed so as to surround the upper part and sides of the return-pole 12 in the same plane as the return-pole 12. FIG. 11 illustrates an example in which a soft magnetic shield 45 is formed so as to surround the upper part and sides of the return-pole 12 in the same plane as the return-pole 12. FIGS. 10 and 11 illustrate the examples which differ from each other in plane shape of the soft magnetic shield. In the examples of FIGS. 10 and 11, the soft magnetic shields 44 and 45 are manufactured and formed by sputtering with the same material as the return-pole 12, concurrently with the formation of the return-pole 12. Such formation enables manufacturing the shield without increasing the number of steps for manufacturing the head.

FIG. 12 illustrates an example in which a soft magnetic shield 46 is formed so as to surround the upper parts and sides of the reader shields 14 and 15.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic head for recording and reproducing on a magnetic recording medium having a soft magnetic under layer, the magnetic head comprising a recording head including a main-pole and a return-pole, and a read head including a pair of reader shields and a magneto-resistive element sandwiched between said pair of reader shields, wherein the magnetic head further comprises a soft magnetic shield disposed so as to surround an upper part of a magnetic member constituting the magnetic head in a height direction of the element, and a side of the member in a track width direction, and wherein a distance between the soft magnetic shield and the magnetic member is longer than a distance between the soft magnetic shield and an air-bearing-surface, and wherein said soft magnetic shield is formed in the same plane, in the same thickness, and of the same material as at least one of layers of the magnetic member constituting the magnetic head.

2. The magnetic head according to claim 1, wherein said magnetic member includes at least one of the main-pole, the return-pole, and the pair of reader shields.

3. The magnetic head according to claim 2, wherein said magnetic member includes the main-pole.

4. The magnetic head according to claim 2, wherein said magnetic member includes the return-pole and the pair of reader shields.

5. The magnetic head according to claim 2, wherein said magnetic member includes the return-pole.

6. The magnetic head according to claim 1, wherein said soft magnetic shield comprises a first soft magnetic shield layer and a second soft magnetic shield layer, the first magnetic shield layer surrounding an upper part of the main-pole, the second magnetic shield layer surrounding an upper part of at least one of the return-pole and the pair of reader shields.

7. The magnetic head according to claim 1, wherein said soft magnetic shield has an end thereof on an air-bearing-surface side disposed at a higher level in the element height direction than a position of the air-bearing-surface of the main-pole.

8. The magnetic head according to claim 1, wherein said soft magnetic shield has a surface opposite to the air-bearing-surface, an area of the opposite surface being larger than one fifth of an area viewed from an opposite side with respect to the air-bearing-surface.

9. The magnetic head according to claim 1, wherein said soft magnetic shield is disposed so as to surround upper parts of the main-pole, the return-pole, and the pair of reader shields in the element height direction, and sides thereof in the track width direction.

10. A magnetic storage apparatus, comprising:
   a magnetic recording medium having a soft magnetic under layer and a magnetic recording layer, which are formed on a substrate;
   a medium driving unit configured to drive said magnetic recording medium;
   a magnetic head for recording and reproducing information on the magnetic recording medium, the magnetic head comprising a recording head including a main-pole and a return-pole, and a read head including a pair of reader shields and a magneto-resistive element sandwiched between said pair of reader shields; and
   a head driving unit for driving said magnetic head with respect to the magnetic recording medium,
   wherein the magnetic head further comprises a soft magnetic shield disposed so as to surround an upper part of at least one of the main-pole, the return-pole, and the reader shields in a height direction of the element, and a side thereof in a track width direction, and wherein a distance between the soft magnetic shield and the magnetic recording medium is shorter than a distance between the soft magnetic shield, and each of the main-pole, the return-pole, and the reader shield, and wherein said soft magnetic shield is formed in the same plane, in the same thickness, and of the same material as at least one of layers of the magnetic member constituting the magnetic head.

11. The magnetic storage apparatus according to claim 10, wherein said magnetic member includes at least one of the main-pole, the return-pole, and the pair of reader shields.

12. The magnetic storage apparatus according to claim 11, wherein said magnetic member includes the main-pole.

13. The magnetic storage apparatus according to claim 11, wherein said magnetic member includes the return-pole and the pair of reader shields.

14. The magnetic storage apparatus according to claim 11, wherein said magnetic member includes the return-pole.

15. The magnetic storage apparatus according to claim 10, wherein said soft magnetic shield comprises a first soft magnetic shield layer and a second soft magnetic shield layer, the first magnetic shield layer surrounding an upper part of the main-pole, the second magnetic shield layer surrounding an upper part of at least one of the return-pole and the pair of reader shields.

16. The magnetic storage apparatus according to claim 10, wherein said soft magnetic shield has an end thereof on an air-bearing-surface side disposed at a higher level in the element height direction than a position of the air-bearing-surface of the main-pole.

17. The magnetic storage apparatus according to claim 10, wherein said soft magnetic shield has a surface opposite to the air-bearing-surface, an area of the opposite surface being larger than one fifth of an area viewed from an opposite side with respect to the air-bearing-surface.

18. The magnetic storage apparatus according to claim 10, wherein said soft magnetic shield is disposed so as to surround upper parts of the main-pole, the return-pole, and the pair of reader shields in the element height direction, and sides thereof in the track width direction.

* * * * *